United States Patent [19]
Pati et al.

[11] Patent Number: 5,241,571
[45] Date of Patent: Aug. 31, 1993

[54] CORROSION RESISTANT ZIRCONIUM ALLOY ABSORBER MATERIAL

[75] Inventors: Satya R. Pati, Simsbury; Lawrence V. Corsetti, Granby, both of Conn.

[73] Assignee: Combustion Engineering, Inc., Windsor, Conn.

[21] Appl. No.: 906,357

[22] Filed: Jun. 30, 1992

[51] Int. Cl.$^5$ ............................................... G21C 3/07
[52] U.S. Cl. .................................. 376/260; 376/419; 376/457; 420/422
[58] Field of Search ............... 376/419, 457, 339, 261, 376/260; 420/422; 148/672

[56] References Cited

U.S. PATENT DOCUMENTS

| | | | |
|---|---|---|---|
| 3,103,476 | 9/1963 | Mumm | 376/419 |
| 3,261,682 | 7/1966 | Rosler et al. | 420/422 |
| 4,197,145 | 4/1980 | Hanneman et al. | 376/457 |
| 4,879,093 | 11/1989 | Garde | 420/422 |
| 4,992,225 | 2/1991 | Van Diemen et al. | 376/339 |
| 5,147,598 | 9/1992 | Kapil | 376/419 |

OTHER PUBLICATIONS

ANS Transactions, vol. 57, pp. 36–38, (1988), Beaudreau, et al.
Metallurgical Progress Report, No. 3, pp. 33–38 (1959).
Neutron Absorber Materials for Reactor Control, pp. 608–609, (1962).
Development of High Corrosion Resistance Zirconium-Base Alloys, Nov. 1990.

*Primary Examiner*—Daniel D. Wasil
*Attorney, Agent, or Firm*—Ronald P. Kananen

[57] ABSTRACT

A burnable absorber controls axial power peaking or moderator temperature coefficient while additional elements are added to improve strength and/or corrosion resistance in a zirconium alloy containing erbium in a range of from about 0.05 to 2 wt. % selected from the group consisting of a naturally occurring distribution of isotopically enriched erbium-167 and a combination thereof; in a range of from a measurable amount up to 1.4% tin; from 0.2 to 0.5 wt. % iron; from 0.07 to 0.25 wt. % chromium; in a range of from a measurable amount up to 0.6 wt. % niobium; in a range of from a measurable amount up to 0.5 wt. % vanadium; 50–120 ppm silicon; 1000–2200 ppm oxygen and a balance of zirconium. Alternatively, the erbium can be replaced by gadolinium in a range of from about 0.05 to 6 wt. % selected from the group consisting of a naturally occurring distribution of gadolinium isotopes, isotopically enriched gadolinium-157 and a combination thereof.

8 Claims, No Drawings

CORROSION RESISTANT ZIRCONIUM ALLOY ABSORBER MATERIAL

BACKGROUND OF THE INVENTION

This invention relates to zirconium alloy burnable absorber materials which are suitable for use as fuel rod cladding tubes and as structural components in light water nuclear reactors (LWRs). Such structural components include guide tubes, or guide thimbles, in some pressurized water nuclear reactor (PWR) fuel assembly designs and channels in boiling water nuclear reactor (BWR) cores. More particularly, this invention relates to burnable absorber-containing zirconium alloys that do not displace fissile materials in reactor cores, while at the same time providing the strength and corrosion resistance required for the specific application at hand.

DESCRIPTION OF THE PRIOR ART

Many LWR fuel designs employ burnable absorber rods to control axial power peaking or moderator temperature coefficient. In some designs, burnable absorber rods are placed in fuel assembly lattice locations, thereby displacing fuel rods. Other designs employ burnable absorber rod inserts in guide thimbles of fuel assemblies. Still other designs involve the formation of burnable-absorber-bearing coatings on the inside diameters of cladding tubes, on fuel pellet surfaces, or involve the distribution of the burnable absorber within the fuel pellet.

The use of erbium as a burnable absorber has been previously discussed wherein erbia ($Er_2O_3$) is homogeneously dispersed in selected fuel pins.[1] Although such absorbers are advantageous over other burnable absorbers in certain fuel management schemes, such an arrangement for the application of burnable absorbers nonetheless displaces fissile material from the fuel rods and reduces the fissile material inventory available to produce power.

Binary zirconium-erbium alloys with 10–90 weight percent (wt. %) erbium as well as Zircaloy-2 with 0.5–2.0 wt. % erbium have been suggested for use in control rod materials. Unfortunately, such alloys were found to have corrosion levels unacceptable for use as control rod materials in PWRs.[2]

Accordingly, it is a continuing problem in this art to develop an absorber material that does not displace fissile material, while exhibiting adequate corrosion resistance.

SUMMARY OF THE INVENTION

In view of the foregoing, it is an object of the present invention to overcome these and other drawbacks of the prior art.

Specifically, it is one object of the present invention to provide a burnable absorber that does not displace any fissile material from the fuel rods so that a higher fissile material inventory is available to produce power.

It is a further object of the present invention to incorporate burnable absorber materials in cladding tubes and other zirconium bearing structural components, so that such components can be fabricated in facilities that do not require radiological materials handling capabilities or licenses.

It is a further object of the present invention to provide cladding tubes for fuel rods constructed from such alloys.

It is a further object of the present invention to provide cladding tubes of such alloys which include an outer layer of a more corrosion resistant material in the form of duplex tubing.

It is a further object of the present invention to provide components such as guide tubes, or guide thimbles, in PWR fuel assemblies and channels in BWR cores constructed from such alloys. Such structural components may contain outer layers of a more corrosion resistant material.

It is a further object of the present invention to use erbium as the burnable absorber for application in PWRs and gadolinium as the burnable absorber for application in BWRs.

It is a main feature of the present invention to replace all or a portion of the naturally occurring erbium with purified erbium-167 isotope in PWRs and to replace all or a portion of the naturally occurring gadolinium with purified gadolinium-155, purified gadolinium-157, or both, in BWRs because fuel cycle economies are improved due to a reduction in residual concentrations originating from undesirable isotopes present in the natural materials.

The present invention provides a zirconium alloy absorber material comprising a) a natural distribution of erbium isotopes, enriched erbium-167 isotope, or both, in a range of from 0.05 wt. % to 2 wt. % or b) a natural distribution of gadolinium isotopes, isotopically enriched gadolinium-155, isotopically enriched gadolinium-157, or any combination thereof, in a range of from 0.05 wt. % to 6 wt. %; tin in a range of up to 1.4 wt. %; iron in a range from 0.2 to 0.5 wt. %; chromium in a range from 0.07 to 0.25 wt. %; niobium in a range of up to 0.6 wt. %; vanadium in a range of up to 0.5 wt. %; 50 to 120 ppm silicon; 1000 to 2200 ppm oxygen; and the balance zirconium.

DESCRIPTION OF THE PREFERRED EMBODIMENTS

The present invention involves the fabrication and use of zirconium-alloy-based absorber materials useful for, but not limited to, PWR and BWR fuel rod claddings and structural materials that include channels for BWRs and guide tubes, or guide thimbles, for some designs of PWRs.

The specific composition ranges of the alloys of interest are chosen to provide adequate mechanical properties for fabrication and, at the same time, provide corrosion resistance and ductility under irradiation that are superior to commercial Zircaloys. There have been proposed alloys similar in composition to those claimed herein, but without erbium or gadolinium, which have been fabricated into cladding tubes and also used as outer corrosion resistant layers over commercial Zircaloy-4 tubings.

According to an embodiment of the present invention, in the case of PWRs, erbium is used as the burnable absorber. The material preferably contains erbium in a range from 0.05% to 2 wt. %. The erbium may comprise a naturally occurring distribution of erbium isotopes, enriched erbium-167 isotope, or a combination of both depending upon the application. For example, the use of an isotopically enriched erbium-167 isotope, which is of primary interest in controlling reactivity early in life, is preferred when it is desired to minimize the amount of erbium addition or when lower residual concentrations are desired. The overall wt. % of erbium required depends on the relative proportions of natural and isotopically enriched erbium, the specific application (e.g., whether the alloy absorber material is to be used as fuel rod cladding or as structural components), and the fuel design of interest.

The actual concentration range for erbium and other burnable absorbers is based on the projected need for such burnable absorbers to satisfy fuel design requirements. The preferred upper limit of 2 wt. % in the case of erbium is well within the range of erbium solubility in zirconium (in a range of from a measurable amount up to 20 wt. %), and no second phase formation is expected over the range of processing parameters that may be employed to fabricate tubing. Isotopically enriched erbium-167 isotope is less likely than a naturally occurring distribution of erbium isotopes to pose a problem with respect to second phase formation. For example, a 0.5 wt. % concentration of purified erbium-167 isotope should be sufficient to maintain reactivity hold-down characteristics equivalent to that obtained with a 2 wt. % addition of a naturally occurring distribution of erbium isotopes.

The same concept as that discussed above with respect to erbium is applicable in another embodiment of the invention with respect to gadolinium. Such materials are typically used in BWRs but may be appropriate for other applications. In BWR applications, gadolinium is added in amounts ranging from 0.05 to 6.0 wt. % depending on application. The added gadolinium can comprise a naturally occurring distribution of gadolinium isotopes, gadolinium-155, gadolinium-157, and various combinations of any two or three of these materials. Gadolinium, like erbium, is a member of the lanthanide or rare-earth family. Higher amounts of isotopically enriched gadolinium are desirable, for example, when it is desired to minimize the total amount of gadolinium (in any form) added to the alloy or when lower residual concentrations desired. In addition to the relative portions of natural and isotopically enriched gadolinium, the overall amount of gadolinium added to the alloy depends on the fuel design and on the specific application of interest (e.g., whether the alloy is to be used as a fuel rod claddings or as channels in BWRs).

Erbium and gadolinium may also improve corrosion resistance of the alloy. For example, the addition of up to 1 wt. % dysprosium in Zircaloy-2 has not shown any adverse effects on corrosion resistance[3]. Moreover, it is known that the corrosion resistance of zirconium alloys can be improved by the addition of up to 0.5% cerium[4]. The addition of erbium or gadolinium in the above ranges should therefore improve, or at least have no adverse effect upon, the corrosion resistance of zirconium alloys since dysprosium, cerium, erbium and gadolinium all have the same electrochemical valence state and since they all belong to the lanthanide, or rare-earth, group of elements in the periodic table.

Erbium and gadolinium additions in the above described ranges may also improve service life by improving irradiated ductility under conditions of slow strain rate. Such improvements have been observed with praseodymium, a lanthanide element like erbium and gadolinium[5].

Although the unacceptable corrosion rates encountered in a previous attempt to combine erbium with Zircaloy-2[2] are believed by the inventors of the present invention to be primarily due to impurities, optimum combinations of various alloying elements may nonetheless be added to compensate for any potential adverse effects of erbium or gadolinium.

For example, tin may be added in amounts ranging from a measurable amount up to 1.4% to achieve the desired combination of strength and corrosion resistance. Zirconium-base alloys containing 0.5 wt. % tin show superior corrosion resistance when compared to either pure zirconium or commercial Zircaloys which contain a minimum of 1.2 wt. % tin. While a reduction in tin content improves corrosion resistance, it also lowers mechanical strength. This effect may be compensated, for example, by the addition of optimal amounts of solid solution strengthening elements such as niobium and/or oxygen. Iron and chromium additions may also be used to contribute to strength improvement. In alloys in which tin is absent, vanadium, iron and higher levels of oxygen may contribute to strength.

Iron is added in an amount ranging from 0.2 to 0.5 wt. % and chromium is added in an amount ranging 0.07 to 0.25 wt. % to contribute to strength and corrosion resistance. Zirconium-base alloys containing 0.5 wt. % tin, 0.2 wt. % iron, and 0.1 wt. % chromium have shown corrosion resistance superior to commercial grades of Zircaloy-4 in autoclave tests[7]. The addition of iron above 0.24 wt. % (the upper solubility limit of iron for Zircaloys) also has shown further improvement in corrosion resistance.

Niobium may be added in amounts ranging from a measurable amount up to 0.6 wt. % to improve strength and corrosion resistance[6].

Vanadium may be added in an amounts ranging from a measurable amount up to 0.5 wt. % to improve corrosion resistance and mechanical properties.

Silicon is used in amounts ranging from 50–120 ppm element to improve corrosion resistance. By contrast, the ASTM specifications for Zircaloy-2 and Zircaloy-4 consider silicon as an impurity and only specify an upper limit for silicon. Autoclave tests performed on a zirconium alloy containing less than 50 ppm silicon have shown that these materials have a poorer corrosion resistance than compositions containing higher concentrations of silicon.

Oxygen is added in an amount ranging from 1000 to 2200 ppm to function as a solid solution hardening alloying element.

The specific composition of the alloy can be varied to suit performance requirements. For example, a tin content on the lower end of the proposed range may be used in fuel rod cladding because lowering the concentration of tin in zirconium alloys improves the corrosion resistance of such materials. However, since lowering of tin content leads to a reduction in strength, higher amounts of solid solution strengtheners, such as niobium or oxygen, for example, may be added to compensate for the lower tin content. Erbium, which also goes into solid solution, may also be added to contribute to strength. Finally, the iron content of the alloys for fuel rod cladding may be at the higher end of the range, since higher iron concentrations are beneficial for increasing corrosion resistance and mechanical strength.

According to one embodiment of the present invention, a zirconium-erbium alloy, typically for PWR applications, comprises a naturally occurring distribution of erbium isotopes, isotopically enriched erbium-167 or a combination of both in a range of from 0.05 wt. % to 2 wt. %; tin up to 1.4%; iron in a range from 0.2 to 0.5 wt. %; chromium in a range from 0.07 to 0.25 wt. %; niobium up to 0.6 wt. %; vanadium up to 0.5 wt. %; 50 to 120 ppm silicon; 1000 to 2200 ppm oxygen; and the balance zirconium. Similar alloys can be constructed, typically for BWR applications, by substituting the erbium with 0.05 to 6.0 wt. % of a naturally occurring distribution of gadolinium isotopes, isotopically enriched gadolinium-155, isotopically enriched gadolinium-157 or a combination of any two or all three of these materials.

Other embodiments of the present invention include alloy compositions for burnable-absorber-containing fuel rod claddings. Embodiments that are appropriate for the fuel design of interest include: a) tin 0.5 wt. %, iron 0.46 wt. %, chromium 0.23 wt. %, silicon 50 to 120 ppm, oxygen 1600 to 2200 ppm, and a balance of zirconium; b) tin 0.5 to 1 wt. %, iron 0.35 wt. %, chromium 0.25 wt. %, niobium 0.3 wt. %, silicon 50 to 120 ppm, oxygen 1000 to 1200 ppm, and a balance of zirconium; and c) iron 0.3 wt. %, vanadium 0.25 wt. %, silicon 50 to 120 ppm, oxygen 2200 ppm, and a balance of zirconium. Each of the above embodiments contains a naturally occurring distribution of erbium isotopes, isotopically enriched erbium-167, or a combination of both in an amount ranging from 0.05 to 2.0 wt. % or contains a naturally occurring distribution of gadolinium isotopes, isotopically enriched gadolinium-155, isotopically enriched gadolinium-157, or any combination thereof in an amount ranging from 0.05 to 6.0 wt. %.

If the corrosion resistance of the zirconium alloy absorber material to be used for the cladding tube is found to be inadequate for the specific application, another embodiment of the present invention provides for the application of a more corrosion resistant layer on the outside diameter of a fuel rod cladding tube to further improve the corrosion resistance. The composition, processing, and thickness of the outer corrosion layer will vary with the application and the compatibility of fabrication. Alloys similar in composition to those described herein, but without the addition of a burnable absorber, have been successfully applied to Zircaloy-4 tubing to improve corrosion resistance. This concept is applicable, but not limited to, both BWR and PWR fuel rods.

For structural components such as guide tubes in PWRs and channels in BWRs, higher strengths than those required for fuel rod claddings may be required. As a result, alloys for such structural components may contain tin at somewhat higher levels than that required for cladding tubes. Higher levels of tin should pose no serious corrosion problems because, in the absence of heat flux, corrosion is not as critical in the case of structural components as it is in the case of fuel rod claddings.

According to an embodiment of the present invention, typical zirconium-erbium alloys (for use, e.g., in guide tubes in PWRs and channels in BWRs) include 0.5 to 1.4 wt. % tin, 0.2 to 0.5 wt. % iron, 0.07 to 0.25 wt. % chromium, 0.1 to 0.3 wt. % niobium, 50 to 120 ppm silicon, 1200 to 1800 ppm oxygen, and a balance of zirconium. Each of the above embodiments contains, for example, a naturally occurring distribution of gadolinium isotopes, isotopically enriched gadolinium-155, isotopically enriched gadolinium-157, or any combination thereof in an amount ranging from 0.05 to 6.0 wt. % or contains a naturally occurring distribution of erbium isotopes, enriched erbium-167 isotope or any combination of both in an amount ranging from 0.05 to 2.0 wt. %.

As in the case of fuel rod cladding tubes, a more corrosion resistant outer layer can be applied to structural members in the LWR cores including, but not limited to, guide tubes in PWRs and channels in BWRs. According to an embodiment of the present invention, the corrosion-resistant outer layer is applied on all (i.e., inner and outer) surfaces of the structural members, because all of such surfaces are exposed to corrosive environments of high-temperature water.

Thus, the invention of the zirconium alloy absorber material described in this disclosure can be designed to suit the hold down characteristics of interest, while maintaining adequate strength and corrosion characteristics. A new zirconium alloy, according to this invention, with optimum combinations of erbium or gadolinium, tin, iron, chromium, niobium, vanadium, silicon, oxygen and the balance zirconium can provide these characteristics.

BIBLIOGRAPHY

1) Beaudreau, J. J., Jonsson, A. and Shapiro, N. L., "Evaluation of Erbia as a Burnable Absorber in a 24-Month, Low Leakage C-E Core," *ANS Transactions*, Vol. 57, pp. 36–38 (1988).

2) United States Department of the Interior Bureau of Mines, Region I, *Metallurgical Progress Report*, No. 3, pp. 33–38 (1959).

3) Anderson, W. K. and Theilacker, J. S., Eds., *Neutron Absorber Materials for Reactor Control*, Naval Reactors, Division of Reactor Development, United States Atomic Energy Commission, 1962, pp. 608–609.

4) Rosler, U., U.S. Pat. No. 3,261,682 "Zirconium Alloys Containing Cerium and Yttrium," issue date Jul. 19, 1966.

5) Hanneman, R. E., Lee, D. and Tedmon, Jr., L. S., U.S. Pat. No. 4,197,145, "Zirconium-Base Alloy Structural Component for Nuclear Reactor and Method," issue date Apr. 8, 1980.

6) Garde, A. M., U.S. Pat. No. 4,879,093, "Ductile Irradiated Zirconium Alloy," issue date Nov. 7, 1989.

7) Isobe, T., Matsuo, Y., "Development of High Corrosion Resistance Zirconium-Base Alloys," paper presented at the 9th International Symposium on Zirconium in the Nuclear Industry, Kobe, Japan, November 1990, to be published as ASTM STP 1123 (1991).

TABLE 1

| Preferred Embodiments of Zirconium Alloy Absorber Materials | | |
|---|---|---|
| Erbium, wt % (naturally occurring distribution and/or isotopically purified) | 0.05–2.0 | |
| Gadolinium (naturally occurring distribution and/or isotopically purified) | | 0.05–6.0 |
| Tin, wt % | $\leq 1.4$ | $\leq 1.4$ |
| Iron, wt % | 0.2–0.5 | 0.2–0.5 |
| Chromium, wt % | 0.07–0.25 | 0.07–0.25 |
| Niobium, wt % | $\leq .6$ | $\leq 0.6$ |
| Vanadium, wt % | $\leq .5$ | $\leq 0.5$ |
| Silicon, ppm | 50–120 | 50–120 |
| Oxygen, ppm | 1000–2200 | 1000–2200 |

We claim:

1. A zirconium alloy absorber material comprising:

erbium in a range of from about 0.05 to 2.0 wt. % selected from the group consisting of a naturally occurring distribution of erbium isotopes, isotopically enriched erbium-167, and a combination thereof;

iron in a range from about 0.2 to about 0.5 wt. %;

about 50 to 120 ppm silicon;

about 1000 to 2200 ppm oxygen;

one or more additional alloying metals selected from the group consisting of tin in a range of from a measurable amount up to about 1.4 wt. %, chromium in a range from about 0.07 to about 0.25 wt. %, niobium in a range of from a measurable amount up to about 0.6 wt. %, and vanadium in a range of from a measurable amount up to about 0.5 wt. %; and a balance of zirconium.

2. The zirconium alloy absorber material of claim 1, wherein said alloy is for use in a nuclear reactor fuel rod cladding tube and wherein said iron is present in an amount of about 0.46 wt. %, said oxygen is present in an amount ranging from about 1600-2200 ppm and said additional alloying metals comprise tin in an amount of about 0.5 wt. % and chromium in an amount of about 0.23 wt. %.

3. The zirconium alloy absorber material of claim 1, wherein said alloy is for use in a nuclear reactor fuel rod cladding tube and wherein said iron is present in an amount of about 0.35 wt. %, said oxygen is present in an amount ranging from about 1000 to about 1200 ppm, and said additional alloying metals comprise tin in a range of from about 0.5 to 1.0 wt. %, chromium in an amount of about 0.25 wt. % and niobium in an amount of about 0.3 wt. %.

4. The zirconium alloy absorber material of claim 1, wherein said alloy is for use in a nuclear reactor fuel rod cladding tube and wherein said iron is present in an amount of about 0.3 wt. %, said oxygen is provided in an amount of about 2200 ppm and said additional alloying metals further comprise vanadium in an amount of about 0.25 wt. %.

5. The zirconium alloy absorber of claim 2, further comprising an outer layer of a more corrosion resistant material in the form of a duplex tubing.

6. The zirconium alloy absorber material of claim 1, wherein said alloy is for use as a structural component in a nuclear reactor and wherein said oxygen is provided in an amount ranging from about 1200 to about 1800 ppm and said additional alloying metals further comprise tin in a range from about 0.5 to about 1.4 wt. %, chromium in a range from about 0.07 to about 0.25 wt. % and niobium in range from about 0.1 to about 0.3 wt. %.

7. The structural component of claim 6, further comprising layers of a more corrosion resistant layer on both the inside and outside surfaces of said structural component.

8. A method of making a zirconium alloy absorber material comprising the steps of:

providing a zirconium alloy having iron in a range from about 0.2 to about 0.5 wt. %; about 50 to 120 ppm silicon; about 1000 to 2000 ppm oxygen; one or more additional alloying metals selected from the group consisting of tin in a range of from a measurable amount up to about 1.4 wt. %, chromium in a range from about 0.07 to about 0.25 wt. %, niobium in a range from a measurable amount up to about 0.6 wt. %, and vanadium in a range of from a measurable amount up to about 0.5 wt. %; and a balance of zirconium; and adding erbium in a range of from about 0.05 to 2.0 wt. % selected from the group consisting of a naturally occurring distribution of erbium isotopes, isotopically enriched erbium-167, and a combination thereof to act as a burnable absorber.

* * * * *